United States Patent
Paritosh

(10) Patent No.: US 11,250,087 B2
(45) Date of Patent: *Feb. 15, 2022

(54) CONTENT ITEM AUDIENCE SELECTION

(71) Applicant: Google LLC, Mountain View, CA (US)

(72) Inventor: Praveen Paritosh, Oakland, CA (US)

(73) Assignee: Google LLC, Mountain View, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/930,880

(22) Filed: Jul. 16, 2020

(65) Prior Publication Data

US 2020/0349211 A1    Nov. 5, 2020

Related U.S. Application Data

(63) Continuation of application No. 15/860,830, filed on Jan. 3, 2018, now Pat. No. 10,747,835, which is a
(Continued)

(51) Int. Cl.
*G06F 7/00* (2006.01)
*G06F 16/9535* (2019.01)
(Continued)

(52) U.S. Cl.
CPC .... *G06F 16/9535* (2019.01); *G06F 16/90324* (2019.01); *G06F 16/335* (2019.01)

(58) Field of Classification Search
CPC ........... G06F 16/9535; G06F 16/90324; G06F 16/335
(Continued)

(56) References Cited

U.S. PATENT DOCUMENTS 5,673,369 A    9/1997    Kim
6,598,043 B1   7/2003    Baclawski
(Continued)

FOREIGN PATENT DOCUMENTS

KR   10-2011-0048065   5/2011
WO   2010/024922       3/2010

OTHER PUBLICATIONS

International Search Report and Written Opinion in International Application No. PCT/US2014/021182, dated Nov. 10, 2014, 10 pages.
(Continued)

*Primary Examiner* — Md I Uddin
(74) *Attorney, Agent, or Firm* — Fish & Richardson P.C.

(57) ABSTRACT

Methods, systems, and apparatus, including computer programs encoded on a computer storage medium, for selecting an audience for content are disclosed. In one aspect, a method includes receiving, from a content item provider, a request to distribute content items to users that have been deemed interested in a particular entity. First users that have expressed an interest in the particular entity are identified. Expansion entities for the particular entity are identified in a knowledge graph. At least one of the expansion entities can be connected to the particular entity by a relationship path. Second users are identified. The second users are deemed interested in the particular entity based on the second users having expressed an interest in an expansion entity. The content items are provided to at least a portion of the first users and at least a portion of the second users.

20 Claims, 6 Drawing Sheets

Related U.S. Application Data continuation of application No. 13/790,054, filed on Mar. 8, 2013, now Pat. No. 9,881,091.

(51) Int. Cl.
*G06F 16/9032* (2019.01)
*G06F 16/335* (2019.01)

(58) Field of Classification Search
USPC .................................. 707/722, 723, 737, 738
See application file for complete search history.

(56) References Cited

U.S. PATENT DOCUMENTS

| | | |
|---|---|---|
| 7,853,622 B1 | 12/2010 | Baluja |
| 7,904,461 B2 | 3/2011 | Baluja et al. |
| 8,094,794 B2 | 1/2012 | Wright |
| 8,267,783 B2 | 9/2012 | van Datta |
| 8,341,169 B2 | 12/2012 | Nance et al. |
| 8,533,236 B1 | 9/2013 | Baluja et al. |
| 8,572,099 B2 | 10/2013 | Baluja et al. |
| 9,317,610 B2 | 4/2016 | Vaynblat et al. |
| 2007/0061195 A1 | 3/2007 | Liu |
| 2008/0189169 A1 | 8/2008 | Turpin et al. |
| 2008/0275899 A1 | 11/2008 | Baluja et al. |
| 2008/0294607 A1 | 11/2008 | Partovi et al. |
| 2008/0294624 A1 | 11/2008 | Kanigsberg et al. |
| 2009/0018918 A1 | 1/2009 | Moneypenny et al. |
| 2009/0055545 A1 | 2/2009 | Saba |
| 2009/0119167 A1 | 5/2009 | Kendall |
| 2009/0222348 A1 | 9/2009 | Ransom et al. |
| 2010/0030648 A1 | 2/2010 | Manolescu et al. |
| 2010/0057546 A1 | 3/2010 | Wang et al. |
| 2010/0076850 A1 | 3/2010 | Parekh et al. |
| 2010/0132049 A1 | 5/2010 | Vernal et al. |
| 2010/0217670 A1 | 8/2010 | Reis et al. |
| 2010/0257023 A1* | 10/2010 | Kendall ................ G06Q 30/02 705/14.46 |
| 2010/0318537 A1* | 12/2010 | Surendran ............. G06F 16/36 707/759 |
| 2011/0072047 A1 | 3/2011 | Wang |
| 2011/0258032 A1 | 10/2011 | Vadlamani |
| 2012/0047529 A1 | 2/2012 | Schultz et al. |
| 2012/0066073 A1 | 3/2012 | Dilip et al. |
| 2012/0158501 A1 | 6/2012 | Zhang et al. |
| 2012/0158633 A1 | 6/2012 | Eder |
| 2012/0159538 A1 | 6/2012 | Phillips |
| 2012/0232998 A1 | 9/2012 | Schoen |
| 2012/0259695 A1 | 10/2012 | Glassman |
| 2012/0290405 A1 | 11/2012 | Talluri |
| 2012/0311030 A1 | 12/2012 | Lin et al. |
| 2012/0317200 A1 | 12/2012 | Chan |
| 2012/0324027 A1 | 12/2012 | Vaynblat et al. |
| 2013/0014284 A1 | 1/2013 | Vernal et al. |
| 2013/0124447 A1 | 5/2013 | Badros et al. |
| 2013/0159112 A1 | 6/2013 | Schultz |
| 2013/0159883 A1 | 6/2013 | Yerli |
| 2013/0246170 A1 | 9/2013 | Gross et al. |
| 2014/0019233 A1 | 1/2014 | Goder |
| 2014/0019240 A1 | 1/2014 | Zhou et al. |
| 2014/0074620 A1 | 3/2014 | Bosworth |
| 2014/0089103 A1 | 3/2014 | Gross |
| 2014/0089327 A1 | 3/2014 | Pavlidis et al. |
| 2014/0089400 A1 | 3/2014 | Yan et al. |
| 2014/0136323 A1 | 5/2014 | Zhang et al. |
| 2014/0143048 A1 | 5/2014 | Lessin et al. |
| 2014/0207568 A1 | 7/2014 | Rajaram |
| 2014/0236715 A1 | 8/2014 | Aronowich et al. |
| 2014/0236716 A1 | 8/2014 | Shapiro |
| 2015/0220835 A1 | 8/2015 | Wilson |
| 2015/0220836 A1 | 8/2015 | Wilson |
| 2016/0027053 A1 | 1/2016 | Van Datta |

OTHER PUBLICATIONS

U.S. Appl. No. 61/766,812 Provisional.

* cited by examiner

CONTENT ITEM AUDIENCE SELECTION

CROSS-REFERENCE TO RELATED APPLICATION

This application is a continuation of U.S. application Ser. No. 15/860,830, filed Jan. 3, 2018, which is a continuation of U.S. application Ser. No. 13/790,054, filed Mar. 8, 2013, the contents of which are incorporated by reference herein.

BACKGROUND

This specification relates to data processing and audience selection.

The Internet provides access to a wide variety of resources. For example, video and/or audio files, as well as web pages for particular subjects or that present particular news articles are accessible over the Internet. Access to these resources presents opportunities for advertisements (or other sponsored content items) to be provided with the resources. For example, a web page can include "slots" (i.e., specified portions of the web page) in which advertisements (or other content items) can be presented. These slots can be defined in the web page or defined for presentation with a web page, for example, in a separate browser window. Advertisements or other content items that are presented in slots of a resource are selected for presentation by a content distribution system.

SUMMARY

This document describes methods, systems, and computer readable medium that facilitate selection of an audience to which one or more content items, such as advertisements, will be provided. The audience can be selected based on distribution criteria that are provided by a content item provider for which the content item is being distributed. The distribution criteria can specify, for example, a desired reach indicating that the content item should be distributed to a specified number (e.g., 1,000,000) of interested users for a particular entity (e.g., users that have been deemed interested in a particular identifiable person (e.g., a celebrity), place (e.g., national park), thing (e.g., ice cream), or concept (e.g., biology)).

For example, an advertiser that is promoting a science fiction movie may specify that the advertisement for the new science fiction movie be presented to interested users for a prequel to the science fiction movie (e.g., users that have been deemed interested in the prequel). In turn, a content item distribution system can identify, as directly interested users for the prequel, users that have expressed an interest in the prequel (e.g., through social networking posts or interaction with a positive feedback user interface element). These directly interested users can then be considered audience members for the advertisement for the new movie.

In some situations, the number of directly interested users for a particular entity (e.g., the prequel entity in the example above), will be less than the desired reach for the content item. In these situations, additional audience members can be selected by identifying users that are likely to be interested in the particular entity based on their expressed interest in another entity that has been identified as having a particular relationship with the particular entity. For example, users that have not explicitly expressed an interest in the prequel may still become additional audience members based on their expressed interest in other movies that were directed by the director of the prequel, their expressed interest in actors that starred in the prequel, or their expressed interest in other entities that have an identified relationship with the prequel.

In some implementations, selection of additional audience members for a content item is performed using information from a social graph and information from a knowledge graph (e.g., a graph different than the social graph). For example, using the social graph, other users that are connected to the directly interested users can be identified, and other entities in which the other users have expressed an interest can be determined. One or more of these other entities can be selected as expansion entities for the particular entity based, at least in part, on a number of the other users that have expressed an interest in the one or more other entities and/or relationships between the one or more entities and the particular entity. For example, assume that a threshold portion of the other users expressed an interest in one of the actors of the prequel. In this example, the expansion entities for the prequel may be the actors of the prequel (or other movies in which the actors starred), and interested users for any of the actors (or the other movies) may be identified as additional audience members for the content item, thereby expanding the audience for the content item based on the relationships between users in a social graph and relationships between entities in a knowledge graph.

In situations in which the systems discussed herein collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used. For example, a user's identity may be treated so that no identifying information can be determined for the user, or a user's geographical location may be generalized where location information is obtained (such as to a city, ZIP code, or state level), so that a particular location of a user cannot be determined. Thus, the user may have control over how information is collected about the user and used by a content server.

In general, one innovative aspect of the subject matter described in this specification can be embodied in methods that include the actions of receiving a request to distribute content to an audience of users that have been deemed interested in a particular entity; identifying directly interested users that have expressed an interest in the particular entity; identifying socially connected users that are connected, in a social graph, to the directly interested users; identifying, in a knowledge graph, candidate entities that are referenced by interests of the connected users; identifying, for each of one or more of the candidate entities and based on the knowledge graph, a matching relationship between the candidate entity and the particular entity, the matching relationship being a relationship that each of the candidate entity and particular entity share with a same entity; determining a relationship score for each matching relationship, the relationship score for the matching relationship being determined based on a portion of the connected users that have expressed an interest in an entity having the matching relationship with the same entity; selecting an expansion relationship for the particular entity, the expansion relationship being selected based on relationship scores for matching relationships; identifying, based on the social graph, a set of additional users that have expressed an interest in an entity having the expansion relationship; and selecting, as an audience for the content, at least a portion of the directly interested users and at least a portion of the set of additional users. Other embodiments of this aspect include corresponding systems, apparatus, and computer programs, configured to perform the actions of the methods, encoded on computer storage devices.

These and other embodiments can each optionally include one or more of the following features. Determining a relationship score for each matching relationship comprises, for each of at least one matching relationship: identifying a portion of the socially connected users that are directly interested users for an entity having the matching relationship; identifying a portion of the candidate entities having the matching relationship; and determining the relationship score based, at least in part, on the identified portion of the socially connected users and the identified portion of the candidate entities.

Methods can further include the actions of obtaining a performance measure for the expansion relationship, the performance measure being based on a number of user interactions with the content that was provided to users that have expressed an interest in entities having the expansion relationship; and updating the relationship score for the expansion relationship based on the obtained performance measures.

Methods can further include the actions of receiving bid data specifying a first value that will be paid by a content item provider for distribution of the content to users that have been deemed interested in the particular entity; and determining, based on the bid data, a second value that the content item provider will pay for distribution of the content to the set of additional users. Determining the second value can include determining an expansion bid for the expansion relationship, the expansion bid value being determined based, at least in part, on the relationship score for the expansion relationship, the expansion bid value being different from a bid value for distribution of the content item to the directly interested users. Identifying directly interested users can include identifying users that have interacted with a positive feedback user interface element associated with content referencing the particular entity.

Particular embodiments of the subject matter described in this specification can be implemented so as to realize one or more of the following advantages. Implicit interests of users can be determined based on the explicit interests specified by the users and/or social connections of the users. The implicit interests can be used to identify additional audience members for a content item when the number of explicitly interested users does not meet a desired reach for the content item.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
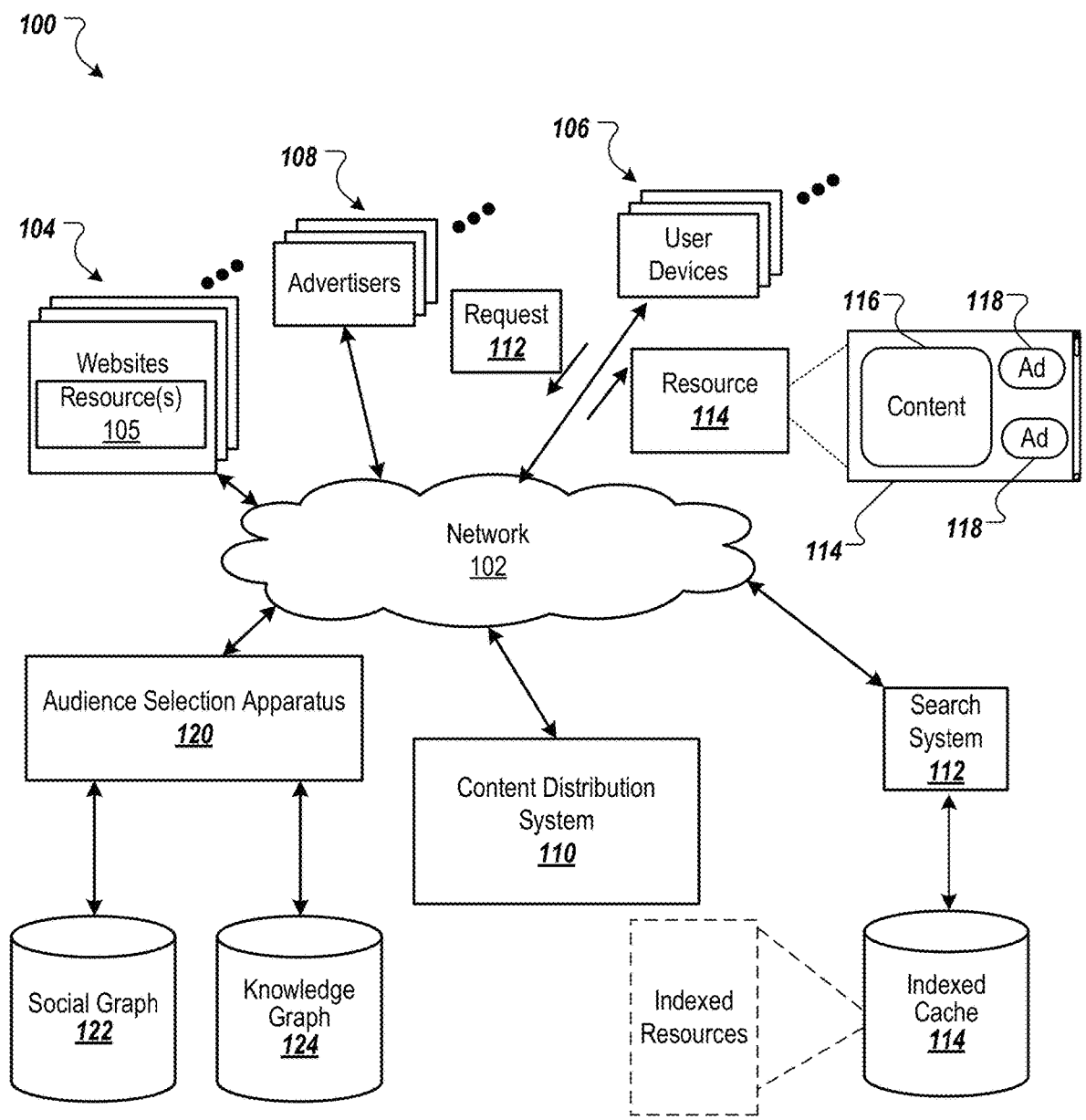
FIG. 1 is a block diagram of an example environment in which content is distributed to user devices.

FIG. 1 is a block diagram of an example environment 100 in which content is distributed to user devices 106. The example environment 100 includes a network 102, such as a local area network (LAN), a wide area network (WAN), the Internet, or a combination thereof. The network 102 connects websites 104, user devices 106, advertisers 108, and a content distribution system 110. The example environment 100 may include many different websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts). Units of content that are presented in (or with) resources are referred to as content items.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, web page from a social network, or another resource 105. The data representing the requested resource 114 can include data that cause presentation of resource content 116 at the user device 106. The data representing the requested resource 114 can also include data specifying a portion of the resource (e.g., a portion of a web page) or a portion of a user display (e.g., a presentation location of another window or in a slot of a web page) in which content items, such as advertisements, can be presented. Throughout this document, these specified portions of the resource or user display are referred to interchangeably as content items slots or advertisement slots 118. Any type of content (e.g., content items other than advertisements) can be presented in these advertisement slots 118.

When a resource 105 is requested by a user device 106, execution of code associated with an advertisement slot 118 in the resource initiates a request for an advertisement (or another type of content item) to populate the advertisement slot 118. When a resource requests an advertisement (or another content item), the resource is considered to have provided an impression. As used throughout this document, the term impression refers to a presentation opportunity for a content item. Impressions are considered to be allocated to advertisers (or other content item providers) that are selected to provide an advertisement (or another content item for presentation.

In some situations, impressions are allocated by a content distribution system 110. For example, some publishers enter into an agreement to have advertisement slots 118 on their resources 105 populated by advertisements (or other content items) selected by the content distribution system 110. In these situations, the publisher will generally include, in the advertisement slots 118, code that, when executed by the user device 106, submits an advertisement request to the content distribution system 110.

The advertisement request can include characteristics of the advertisement slots 118 that are defined for the requested resource 114. For example, a reference (e.g., URL) to the requested resource 114 for which the advertisement slot 118 is defined, a size of the advertisement slot 118, and/or media types that are eligible for presentation in the advertisement slot 118 can be provided to the content distribution system 110. Similarly, keywords associated with a requested resource ("resource keywords") or entities that are referenced by the resource can also be provided to the content distribution system 110 to facilitate identification of advertisements that are relevant to the requested resource 114.

The advertisements (or other content items) that are provided in response to an advertisement request (or another content item request) are selected based on distribution criteria for the advertisements. Distribution criteria are a set of criteria upon which distribution of content items are conditioned. In some implementations, the distribution criteria for a particular advertisement (or other content item) can include distribution keywords that must be matched (e.g., by resource keywords) in order for the advertisement to be eligible for presentation. The distribution criteria can also specify a bid and/or budget for distributing the particular advertisement. Bids are used to conduct an auction to select which advertisement(s) will be presented and/or in which advertisement slot the advertisement(s) will be presented. A content item provider can specify a budget, which will limit the maximum amount that the content item provider will spend over a specified period.

In some implementations, the distribution criteria can also specify a minimum number of users that should be provided the particular advertisement, which is referred to as the reach of the advertisement. For example, the advertiser can specify that a particular advertisement should be presented to at least 1,000,000 different users, such that the desired reach for the advertisement is 1,000,000 unique users. In this example, the content distribution system can identify users that qualify to receive the advertisement (e.g., based on the distribution criteria), and when a page is presented to these qualified users the particular advertisement can be presented in an advertising slot in the page.

In some implementations, the distribution criteria for a particular advertisement (or group of advertisements) can further specify that the advertisement be presented to users that have been deemed interested in a particular entity. A user can be deemed interested in a particular entity, for example, based on the user affirmatively expressing an interest in the particular entity. For example, a user can be deemed interested in a particular movie based on the user publishing a social network post referencing the particular movie, interacting with a positive feedback element associated with the particular movie, or visiting a resource about the particular movie. A user that has affirmatively expressed an interest in a particular entity is referred to as a directly interested user for the particular entity.

When the number of directly interested users that have explicitly expressed an interest in the particular entity meets the desired reach for an advertisement, the desired reach specified by the advertiser can be met by providing the advertisement to this selected audience. Thus, this set of directly interested users is the only audience members that need to be selected for the advertisement to meet the desired reach for the advertisement.

When the number of directly interested users for the particular entity does not meet the desired reach for the advertisement, the desired reach for the advertisement may still be met by selecting at least some of the directly interested users as a portion of the audience members for the advertisement and identifying additional audience members for the advertisement. As described in more detail below, the additional audience members can include users that are considered interested in the particular entity based on their expressed interest in other entities.

The environment 100 includes an audience selection apparatus 120 that can identify additional audience members for an advertisement (or another content item). The audience selection apparatus 120 is a data processing apparatus that utilizes social connections between users and relationship paths between entities to identify users that are likely to be interested in a particular entity, and therefore considered to be interested in the particular entity, even if the users have not explicitly expressed an interest in the particular entity. To facilitate identification of additional audience members for the particular entity, the audience selection apparatus 120 can use information from a social graph 122 and a knowledge graph 124, which are each described in more detail with reference to FIG. 2.

In some implementations, the audience selection apparatus 120 can access or otherwise reference a social graph 122 to identify other users that are considered similar to the directly interested users for the particular entity, and identify other entities in which the other users have expressed an interest. For example, the audience selection apparatus 120 can identify, from the social graph 122, the users that are socially connected (e.g., by way of acceptance of an invitation to be socially connected) to the interested users that have expressed an interest in the particular entity, and identify or log the other entities in which these identified users expressed an interest. The identified or logged entities are referred to as candidate entities. Users that are socially connected to a directly interested user are referred to as socially connected users (or connected users).

The audience selection apparatus 120 accesses or otherwise references a knowledge graph 124 to identify relationships between the candidate entities and the particular entity. For example, some portion of candidate entities may be identified in the knowledge graph 124 as actors in the prequel from the example above, while other candidate entities may be other movies that have a same director as the prequel.

As described in more detail below, the audience selection apparatus 120 can use the identified relationships between the candidate entities and the particular entity to identify an expansion entity (or set of expansion entities) or an expansion relationship for the particular entity. An expansion entity is an entity, other than the particular entity, that shares a relationship in the knowledge graph with the particular entity. The expansion entity can be used to expand an audience to whom a content item will be provided when a content item provider has requested the content item be provided to users interested in the particular entity.

For example, assume that at least a portion of the socially connected users expressed an interest in movies that had a same director as the prequel from the example above. In this example, the audience selection apparatus 120 may determine that users who have expressed an interest in movies having the same director as the prequel are likely to also be interested in the prequel even if they have not explicitly expressed an interest in the prequel. Therefore, the audience selection apparatus 120 can select movies having a same director as the prequel as expansion entities for the prequel. In turn, the audience selection apparatus 120 can identify the users who have expressed an interest in movies by the same screenwriter as additional users that are interested in the prequel and select these identified users as additional audience members for the advertisement (e.g., users beyond the directly interested users for the prequel).

Figure 2:
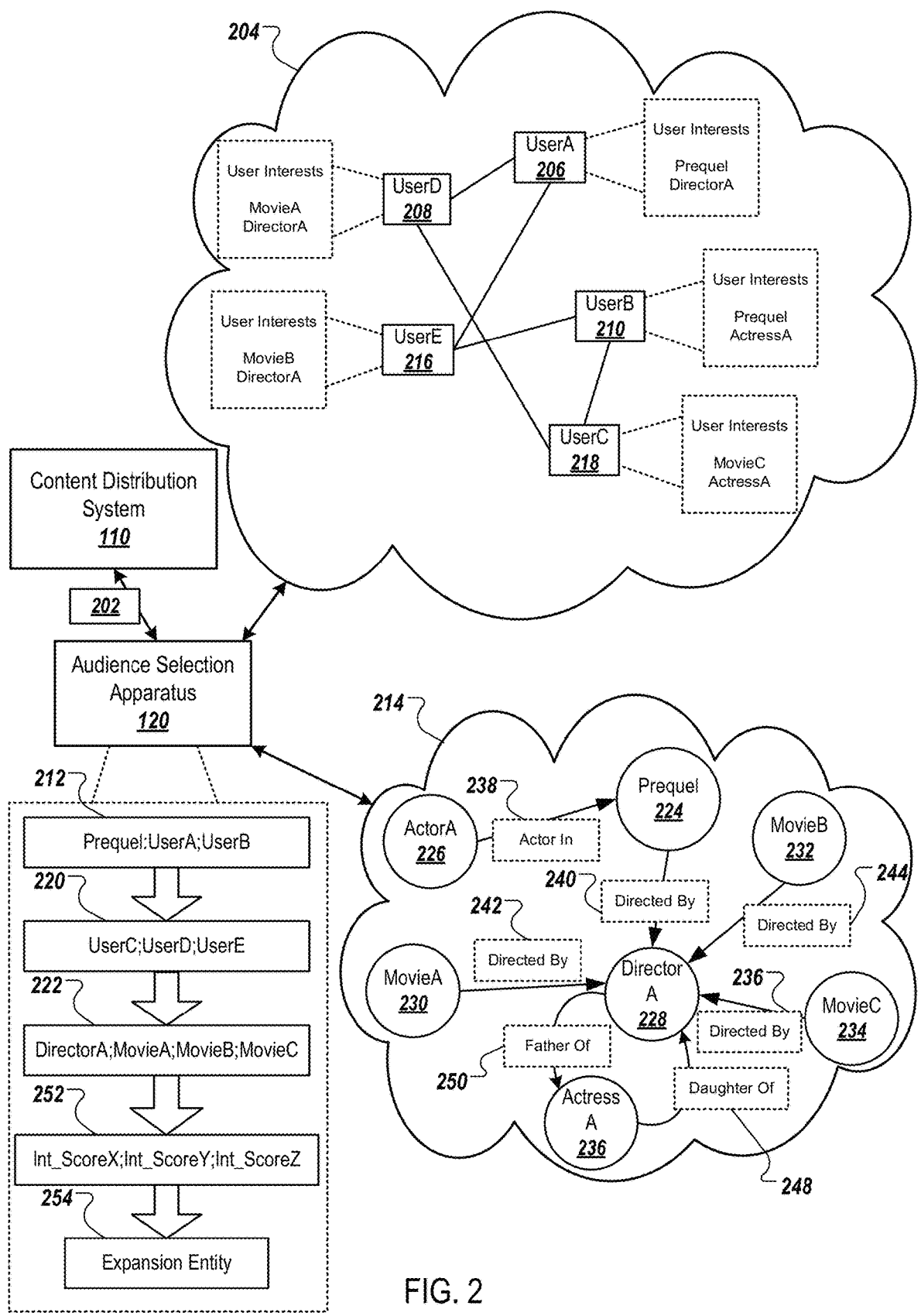
FIG. 2 is a block diagram of an example data flow for selecting an audience.

FIG. 2 is a block diagram of an example data flow 200 for selecting an audience. The data flow 200 begins with the audience selection apparatus 120 receiving distribution criteria 202 for an advertiser from the content distribution system 110 (or a data store). As discussed above, the distribution criteria 202 can include a desired audience reach for an advertisement and a particular entity (or set of entities) that has been determined to be of interest to the audience members. For example, the distribution criteria 202 for the advertiser may specify that the advertiser is requesting a desired audience reach of 1,000,000 users, and that the desired audience is a set of users that are interested in a prequel of a movie that is being promoted by the advertisement. As described with reference to FIG. 5, the distribution criteria can also include bid data for the content item.

The audience selection apparatus 120 can access a social graph 204 (e.g., stored in a data store) to identify directly interested users for the particular entity (e.g., users that have expressed an interest in the particular entity specified by the distribution criteria). A social graph is a representation of social links between users and can include information that the users have provided in a social networking environment (e.g., topics of interest). For example, a social graph can represent interpersonal relationships between two or more different users. Each node in a social graph represents a particular user and links that connect two nodes indicate that users represented by the two nodes are socially related (e.g., through a social network relationship).

Two users can be socially related, for example, by mutually assenting to be socially related to each other (e.g., in a social networking environment). For example, one user (e.g., UserA 206) can send another user (e.g., UserD 208) a request to be socially related and the user that receives the request (e.g., UserD 208) can affirm (e.g., by accepting the request) that a social relation between the users exists. In turn, a link (e.g., link 210) can be created between the nodes that represent the two users.

FIG. 2 provides a visual representation of the social graph 204, but the social graph 204 can also be represented in other ways. For example, the social graph 204 can be stored as an indexed set of relationships between nodes that can be accessed to identify relationships between a particular node and other nodes. The nodes of the social graph 204 can also be indexed according to their respective interests to facilitate identification of users that have expressed an interest in a particular entity.

As described above, users can express an interest in a particular entity, for example, by providing data explicitly indicating that the user is interested in the particular entity. For example, a user that liked the prequel from the example above may specify in their social profile or through a post in a shared data stream that they liked the prequel. The user may also explicitly express an interest in the prequel by visiting a social profile page for the prequel and interact with a positive feedback user interface element (e.g., a button used to express a positive interest in an entity). Further the user may explicitly express an interest in the prequel by interacting with a positive feedback user interface element included in a post made by another user.

Continuing with the example above, the audience selection apparatus 120 can identify a set of directly interested users 212 that have explicitly expressed an interest in the particular entity using the social graph. For example, based on the social graph 204, the audience selection apparatus 120 can determine that that UserA 206 and UserB 210 have each explicitly expressed an interest in the prequel, such that UserA 206 and UserB 210 are each considered directly interested users for the prequel. In turn, the set of directly interested users 212 can be identified as a set of audience members for the advertisement, assuming that any other distribution criteria are also met for each user in the set. In this example, if the audience selection apparatus 120 determines that the number of users in the set of directly interested users 212 meets the desired reach for the advertisement for the movie, the set of directly interested users 212 can be selected as the complete audience for the advertisement.

The audience selection apparatus 120 can also include additional users (e.g., users that have not explicitly expressed an interest in the particular entity) in the audience for the advertisement. For example, if the number of directly interested users that have explicitly expressed an interest in the particular entity is less than the desired reach for the advertisement, the audience selection apparatus 120 may identify additional users to be included in the audience with the directly interested users 212. Similarly, even when the number of directly interested users for the particular entity meets the desired reach for the advertisement, the audience selection apparatus 120 can include additional users in the audience for an advertisement to extend the reach of the advertisement. The additional users that are included in the audience for a content item are referred to as additional audience members.

Additional audience members for a particular entity may be users that have not yet been deemed to have explicitly expressed an interest in the particular entity, but are still considered interested in the entity based on information derived, in part, from the social graph 204 and/or a knowledge graph 214. For brevity, additional users that are considered interested in a particular entity without having been deemed to have explicitly expressed an interest in the particular entity are referred to as implicitly interested users for the particular entity.

To identify implicitly interested users for a particular entity, the audience selection apparatus 120 can identify other entities of interest to other users that are socially connected to directly interested users, determine, among the other users, a level of interest in the other entities, and/or evaluate the relationships between the other entities and the particular entity. In turn, the audience selection apparatus 120 can select an expansion entity from the other entities, and identify, as implicitly interested users for the particular entity, users that are directly interested users for the expansion entity.

For example, with reference to FIG. 2, the audience selection apparatus 120 can access (or otherwise obtain information from) the social graph 204 to determine that UserA 206 is socially connected to UserD 208 and UserE 216, and that UserB 210 is socially connected to UserE 216 and UserC 218. Thus, the audience selection apparatus 120 can identify UserC 218, UserD 208, and UserE 216 are members of a set of connected users 220 that are socially connected to the directly interested users for the particular entity.

The audience selection apparatus 120 can identify a set of candidate entities 222 based on the interests for the set of connected users 220. The set of candidate entities 222 for the set of connected users 220 are those entities for which at least one user from the set of users 220 is a directly interested user. For example, UserD 208 has explicitly specified an interest in MovieA. Therefore, the audience selection apparatus 120 can include MovieA in the set of candidate entities 222. Similarly, UserE 216 has explicitly expressed an interest in MovieB, while UserC has explicitly expressed an interest in MovieC, such that the audience selection apparatus 120 can include both MovieB and MovieC in the set of candidate entities 222. In this example, each of UserD and UserE are both directly interested users for DirectorA. Thus, DirectorA is also included in the set of candidate entities 222.

In some implementations, the audience selection apparatus 120 accesses (or otherwise obtains information from) a knowledge graph 214 to identify relationships between the candidate entities in the set of candidate entities 222 and the particular entity, and uses these relationships to facilitate identification of one or more expansion entities for the particular entity. As used in this document, a knowledge graph is a representation of relationships between unique entities, and the knowledge graph can be stored in one or more data stores. Each node in the knowledge graph represents a different entity and pairs of nodes in the knowledge graph are connected by relationship paths (e.g., graph edges) that indicate a relationship between the two entities represented by the pair of nodes.

For example, the knowledge graph 214 includes node 224 representing the prequel 224, node 226 representing ActorA, node 228 representing DirectorA, nodes 230, 232, and 234 that respectively represent MovieA, MovieB, and MovieC, and node 236 representing ActressA. Node 224 and node 226 are connected by a relationship path 238 indicating that ActorA is an actor in the prequel. Node 228, representing DirectorA, is connected to each of node 224, 230, 232, and 234 by relationship paths 240, 242, 244, and 246 indicating that DirectorA is the director of each of the prequel, MovieA, MovieB, and MovieC.

A single pair of nodes can have multiple different relationship paths that connect the pair of nodes. For example, node 236, which represents ActressA, is connected to node 228, which represents DirectorA, by relationship path 248 indicating that ActressA is the daughter of DirectorA, and by relationship path 250 indicating that DirectorA is the father of ActressA. If additional relationships were identified between DirectorA and ActressA additional relationship paths could be used to represent these relationships.

Using information obtained from the knowledge graph 214 and information obtained from the social graph 204, the audience selection apparatus 120 can generate a set of interest scores 252 (e.g., Int_ScoreX; Int_ScoreY; Int_ScoreZ). An interest score is a measure of interest in an entity. In some implementations, the interest score indicates a likelihood that directly interested users for a candidate entity are also interested users for the particular entity. When the interest score for a candidate entity is above a specified threshold, the candidate entity can be identified as an expansion entity for the particular entity. In turn, directly interested users for the expansion entity are classified as implicitly interested users for the particular entity.

Interest scores can be determined, based at least in part, on a portion (e.g., a number or a percentage) of the users from the set of connected users 220 that are directly interested users for the candidate entity. For example, according to the social graph 204, UserD 208 and UserE 216 are each directly interested users for DirectorA, while User C 218 is not an explicitly interested user for DirectorA. In this example, 2 out of the 3 (e.g., 66.67% of) users in the set of connected users are directly interested users for DirectorA. Meanwhile, from the set of connected users 220, only UserD 208 is a directly interested user for MovieA, only UserE 216 is a directly interested user for MovieB, and only UserC 218 is a directly interested user for MovieC. Among the set of connected users 220, DirectorA is the entity that has the highest portion of directly interested users. Thus, DirectorA could be an expansion entity for the prequel if this portion of directly interested users were used as the interest score.

The interest scores can be based on additional (or different) factors beyond a portion of the set of connected users 220 that are directly interested users for the candidate entity. For example, the interest score for a candidate entity can be increased when one or more of the directly interested users for the particular entity are also directly interested users for the candidate entity. For example, UserA 206, who is a directly interested user for the prequel is also a directly interested user for DirectorA, such that the interest score for DirectorA may be increased to reflect the shared interest of these related entities.

In some implementations, the interest score for a candidate entity is based, at least in part, on a relationship score for matching relationships between the particular entity and the candidate entities. A relationship score is a measure of interest, e.g., by the set of connected users, in candidate entities having a particular relationship that is shared by the particular entity. For example, as noted above, the prequel has a relationship of "directed by" with DirectorA as indicated by the relationship path between the prequel and DirectorA. Similarly, MovieA, MovieB, and MovieC each have the relationship "directed by" with DirectorA. In this example, the relationship "directed by DirectorA" is a matching relationship between the particular entity and the candidate entities MovieA, MovieB, and MovieC. The relationship score for the relationship "directed by DirectorA" can be determined, for example, based on a portion of the set of connected users 220 that are directly interested users for other entities (e.g., movies) that have the matching relationship "directed by DirectorA" (e.g., by being connected to DirectorA by way of a relationship path specifying the relationship "directed by"). For example, the relationship score for "directed by DirectorA" can increase as the portion of the set of users that are directly interested users for other entities (e.g., movies) that are directed by Director A.

The relationship score can be used, for example, to increase (or otherwise adjust) the interest scores of entities that have the matching relationship. For example, the interest scores for MovieA, MovieB, and MovieC may be increased (e.g., scaled up) using the relationship score for "directed by Director A" since each of these entities has the matching relationship "directed by" with DirectorA. A relationship score can be determined for any relationship or set of relationships relative to the particular entity.

The interest score for a candidate entity can be adjusted based on the degree of separation, in the knowledge graph, between the candidate entity and the particular entity. For example, DirectorA has a first degree of separation with the prequel (e.g., because the node 228 is directly connected to the node 224 by relationship path 240), while MovieB has a third degree of separation with the prequel (e.g., because the node 232 is separated from node 224 by two relationship paths). Thus, the interest score for DirectorA may be increased relative to the interest score for MovieB (or the interest score for MovieB may be decreased relative to the interest score for DirectorA) based on DirectorA having a lower degree of separation from the prequel.

In some implementations, the audience selection apparatus 120 selects an expansion entity 254 for the particular entity based on the set of interest scores 252. For example, the audience selection apparatus 120 can identify, as the expansion entity 254, the candidate entity having the highest interest score.

In some implementations, the audience selection apparatus 120 can additionally, or alternatively, select an expansion relationship that will be used to select expansion entities. For example, the audience selection apparatus 120 can identify the matching relationship having a highest relationship score, and select, as expansion entities, one or more entities (e.g., candidate entities or other entities) having the matching relationship. To illustrate, assume that the matching relationship "directed by DirectorA" is identified to have the highest relationship score among all matching relationships. In this example, this matching relationship is selected as the expansion relationship. Thus, the audience selection apparatus 120 can select, as expansion entities for the particular entity, any (or all) entities having the matching relationship "directed by DirectorA," even if some of the entities were not originally selected as candidate entities based on the interests of the set of connected users 220. In some implementations, an expansion relationship is a relationship representing a set of entities that are likely to be of interest to a user that has expressed an interest in any of the entities in the set. Expansion relationships are described in more detail with reference to FIG. 4.

Using the social graph 204, the audience selection apparatus 120 can identify users that are directly interested users for the expansion entities, and select these users (or a proper subset thereof) as additional audience members for the advertisement. In turn, the content distribution system 110 can distribute the advertisement to at least a portion of the additional audience members.

Figure 3:
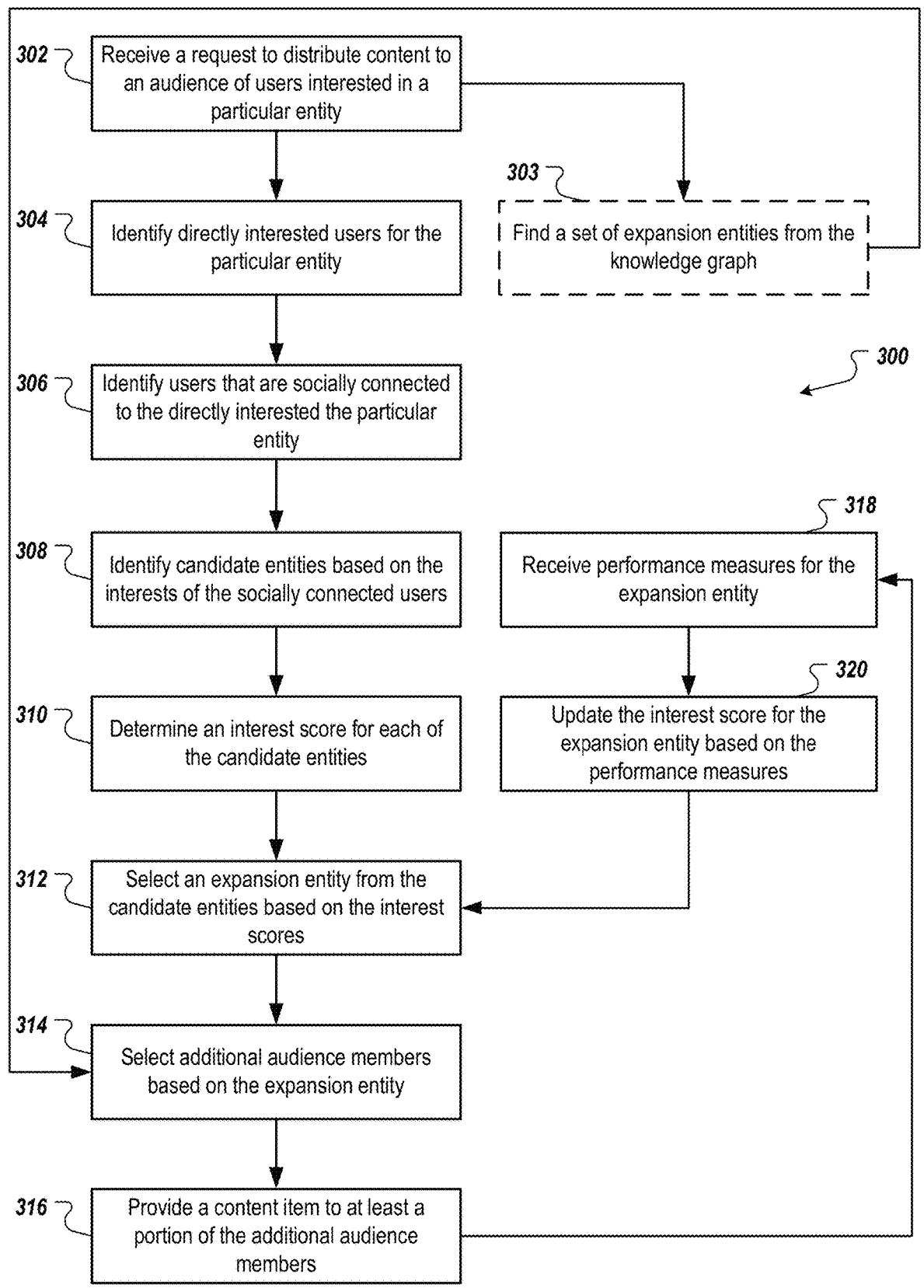
FIG. 3 is a block diagram of an example process for selecting audience members for a content item.

FIG. 3 is a block diagram of an example process 300 for selecting audience members for a content item. The process 300 can be performed by one or more data processing apparatus, such as the audience selection apparatus 120 and/or the content distribution system 110 of FIG. 1. Operations of the process 300 can be implemented by execution of instructions stored on a non-transitory computer readable medium and that cause one or more data processing apparatus to perform operations of the process 300.

A request to distribute content to an audience of users that have been deemed interested in a particular entity is received (302). In some implementations, the request is a request to distribute one or more advertisements to an audience of users that are considered interested in the particular entity. For example, as discussed above, an advertiser of a new movie can submit a request to an advertisement management system requesting that the advertisement management system distribute an advertisement for the new movie to users that are interested in a prequel of the movie.

The request can include, for example, a desired reach indicating a number of users that are to be included in the audience of users to whom the content is distributed. The desired reach can be expressed as a total number of different users to whom the content is to be provided. For example, an advertiser that is promoting a new movie may request that an advertisement for the movie be presented to at least 1,000,000 different users. Similarly, an advertiser that is promoting a new song may request that a sample portion of the song be distributed to 1,000,000 different users.

The particular entity can be any person, place, or concept specified by the advertiser. For example, the advertiser that is promoting the new movie may specify that the advertisement for the movie is to be presented to users that have been deemed interested in a prequel of the movie. Similarly, the advertiser promoting the new song may request that the sample portion of the song be distributed to users that have been deemed interested in the band that performs the song.

In some implementations, a set of expansion entities can be optionally identified in the knowledge graph based on the particular entity (303). The set of expansion entities can be identified as one or more entities that are connected, either directly or indirectly, to the particular entity though a relationship path. For example, entities that are directly connected to the particular entity by one or more relationship paths can be selected for inclusion in the set of expansion entities. Additionally, if the particular entity and another entity share a same relationship with a third entity (e.g., where the third entity is directly connected to each of the particular entity and the other entity), can be selected for inclusion in the set of expansion entities. The set of expansion entities can be used to select additional audience members (314), as described below.

Directly interested users for the particular entity are identified (304). As noted above, directly interested users for a particular entity are those users that have expressed an interest in the particular entity. For example, a directly interested user for the prequel of the movie being advertised can be a user that has affirmatively expressed an interest in the prequel. Similarly, a directly interested user for the band that performs the song can be a user that has affirmatively expressed an interest in the band.

A user can affirmatively express an interest in an entity, such as the prequel or the band discuss above, in many different ways. For example, a user can affirmatively express an interest in an entity by including a reference to (e.g., including the name of) the entity in a social network post, interacting with a positive feedback element (e.g., a +1 button) associated with a reference to the entity, or visiting a social network page about the entity. A user can also affirmatively express an interest in an entity by identifying the entity as an interest (e.g., in an interests section of the user's social network profile).

Users that are socially connected to the directly interested users for the particular entity are identified (306). In some implementations, the socially connected users are users that are connected, in a social graph, to the directly interested users. For example, as described above with reference to FIG. 2, two users that have affirmatively identified each other as a social connection (e.g., friend, family member, or business colleague) can be represented by two nodes that are connected by a link representing the social connection.

Using the social graph, a particular node representing a directly interested user can be identified, and each user that is represented by a node connected to the particular node can be deemed a socially connected user (also referred to as a connected user) for the directly interested user. In this way, connected users for each of the directly interested users can be identified, and included in a set of socially connected users for the directly interested users.

In some implementations, the identification of the socially connected users is performed in response to determining that the number of directly interested users for the particular entity is less than the desired reach that a content provider (e.g., an advertiser) has specified in the request to distribute content. For example, assume that an advertiser has specified a reach of 1,000,000 users for a particular advertisement, and that the users to whom the advertisement is presented should be users that have been deemed interested in a particular entity. In this example, if only 500,000 directly interested users for the particular entity are identified, the socially connected users may then be identified as part of an audience selection process. Thus, in some implementations, a determination that the number of directly interested users is less than the desired reach (e.g., a specified number of users) is made prior to identifying the socially connected users.

Candidate entities are identified based on the interests of the socially connected users (308). In some implementations, the interests of each socially connected user (or a proper subset of the socially connected users) are identified from an interests section of the socially connected user's social profile. In turn, a knowledge graph can be used to identify, based on the interests of the socially connected users, a set of candidate expansion entities for the particular entity.

For example, assume that one socially connected user specifies, in an interests section of their social profile, that they liked a particular movie that is directed by the director that also directed the movie being advertised in the example above and the prequel. In this example, a knowledge graph can be used to identify a node representing the director, and the director can be added to a set of candidate expansion entities for the particular entity (also referred to as a candidate entity).

Similarly, assume that another socially connected user specified, in an interests section of their social profile, that they liked a particular musician that produced the soundtrack for the prequel. In this example, the knowledge graph can be used to identify the node representing the musician, and the musician can be added to the set of candidate entities.

In some implementations, the interests of the socially connected users, and therefore the candidate entities, can be identified based on other information indicative of the interests of the socially connected users. For example, as noted above, interests of a socially connected user can be identified based on the socially connected user's interactions with positive feedback elements (e.g., endorsement buttons) that are associated with entities, posts made by the socially connected user, and other online activity (e.g., registering to receive automatic updates from a site that provides information about an entity). Any, or all, of the entities in which the socially connected users are deemed to have expressed an interest can be included in the set of candidate entities for the particular entity.

An interest score is determined for each of the candidate entities (310). As noted above, an interest score is a measure of interest in an entity. In some implementations, the interest score indicates a likelihood that directly interested users in a candidate entity are also interested in the particular entity. Since socially connected users have an acknowledged social relationship, two socially connected users are considered more likely to have similar entity interests than two randomly selected users. The similarity of interests between the socially connected users and the directly interested users can be further evidenced through similarities between the expressed interests of the socially connected users and/or the directly interested users.

For example, even without additional information, the socially connected users can be assumed to have at least an initial level of interest in the particular entity based on their social relationship with a directly interested user for the particular entity. Additionally, the level of interest, by the socially connected users, in the particular entity will generally increase as additional similarities between the socially connected entities and/or the directly interested entities are identified.

For example, assume that 75% of the socially connected entities express an interest in a movie in which the star actor is the same star actor in the prequel from the examples above. In this situation, this similarity between the socially connected users will increase the likelihood that the socially connected users are interested users for the prequel. In turn, this increased likelihood can be extended as an indication that the likelihood of a particular user being interested in the prequel increases when the user expresses an interest in movies that star the same actor. Thus, an interest score for a candidate entity can be based, at least in part, on a portion (e.g., a number or a percentage) of the socially connected users that have expressed an interest in (e.g., are directly interested users for) the candidate entity. For example, the interest score for a candidate entity can increase with increases to the portion of the socially connected users that have expressed an interest in the candidate entity.

In some implementations, the interest score for a candidate entity can be based, at least in part, on a portion of the directly interested users for the particular entity that have also expressed an interest in (e.g., are directly interested users for) the candidate entity. For example, the interest score for the candidate entity can be increased based on a portion of the directly interested users for the particular entity that have expressed an interest in the candidate entity. Increasing the interest score for a candidate entity based on the candidate entity being of interest to the directly interested users for the particular entity reflects the increased similarity between the interests of the directly interested users for the particular entity and the socially connected users that have expressed an interest in the candidate entity.

As described above with reference to FIG. 2, the interest score for a candidate entity can also be based on a relationship score for matching relationships between the particular entity and the candidate entity, a degree of separation in the knowledge graph between the candidate entity and the particular entity, or other factors that indicate users shared interest in the particular entity based on their expressed interest in the candidate entity.

An expansion entity is selected based on the interest scores (312). In some implementations, a candidate entity having a highest interest score is selected as the expansion entity for the particular entity. In some implementations, each candidate entity having an interest score that meets an interest score threshold is selected as an expansion entity for the particular entity. The interest score threshold can be expressed, for example, as an absolute interest score (e.g., an interest score of 0.5 on a scale from 0.0-1.0). The interest score threshold can also, or alternatively, be expressed relative to other interest scores for the other candidate entities. For example, the interest score threshold can indicate that the candidate entities having interest scores that are in a highest 10% of all interest scores for the candidate entities can be selected as expansion entities for the particular entity.

Additional audience members are selected based on the expansion entity (314). In some implementations, the additional audience members are selected to include users that have expressed an interest in one or more of the expansion entities. The additional audience members need not be, but can be, socially connected to the directly interested users. For example, a user that has expressed an interest in the expansion entity, but not expressed an interest in the particular entity can be selected as an additional audience member irrespective of whether the user is socially connected to a directly interested user for the particular entity. In some implementations, the set of additional audience members that are selected is a disjoint set of users relative to the set of directly interested users for the particular entity.

The number of additional audience members that are selected can be based on the desired reach that was specified in the request to distribute content and/or a number of directly interested users for the particular entity. For example, assume that the desired reach specified in the request to distribute content is 1,000,000 users. Further assume that 800,000 directly interested users were identified for the particular entity. In this example, 200,000 additional audience members can be selected to meet the desired reach for the content.

In some implementations, users are selected to be additional audience members based, in part, on the interest scores of the expansion entities in which the users have expressed an interest. For example, additional audience members can first be selected based on an expansion entity having a highest interest score relative to the particular entity. If the desired reach is not met after selecting additional audience members using the highest scoring expansion entity, additional audience members can be selected using a next highest scoring expansion entity (e.g., the expansion entity having the second highest interest score).

To illustrate and continuing with the example above in which 200,000 additional audience members are needed to meet the desired reach of 1,000,000 users, assume that two expansion entities have been identified for the particular entity. Also assume that 150,000 users expressed an interest in a first expansion entity having an interest score of 0.7 and that 100,000 users expressed an interest in a second expansion entity having an interest score of 0.6. In this example, the 150,000 users that expressed an interest in the first candidate entity may be selected as additional audience members, while 50,000 users that expressed an interest in the second expansion entity can be selected as additional audience members.

Other additional audience member selection techniques can be used. For example, for each of the expansion entities, the portion of the users that are selected as additional audience members can proportionate to (or a function of) the relative values of the interest scores for the expansion entities. Continuing with the example above, if the portion of additional audience members selected from each of the expansion entities is proportional to the interest score, 107,642 additional audience members can be users that expressed an interest in the first expansion entity (e.g., 200,000*0.7/(0.7+0.6)), and 92,308 additional audience members can be users that expressed an interest in the second expansion entity (e.g., 200,000*0.6/(0.6+0.7)).

The content is provided to the users that expressed an interest in the particular entity and at least a portion of the additional audience members (316). In some implementations, the content is an online advertisement, a music file, a video file, or another portion of content. The content can be distributed for example, in response to a request to provide content for presentation to a user that has expressed an interest in the particular entity and/or one of the expansion entities. The request can be received, for example, when a directly interested user or a user that has been selected as an additional audience member requests a social network page or another web page that includes a content item slot.

Performance measures for the expansion entities are received (318). In some implementations, the performance measures for each expansion entity are based, at least in part, on a click-through-rate and/or conversion rate for content provided to additional audience members that were selected based on their interest in the expansion entity, which are referred to as additional audience members for the expansion entity. The click-through-rate for an expansion entity can be, for example, expressed as a ratio of a number of clicks on content provided to the additional audience members for the expansion entity relative to a number of the additional audience members for the expansion entity that received the content. Similarly, a conversion rate for an expansion entity can be, for example, expressed as a ratio of a number of conversions performed by the additional audience members for the expansion entity relative to a number of the additional audience members for the expansion entity that received the content.

The interest scores for the expansion entities are updated based on the performance measures (320). In some implementations, the interest score for each expansion entity can be scaled based on the performance measures for that expansion entity. To illustrate and continuing with the example above in which the first expansion entity has an interest score of 0.7 and the second expansion entity has an interest score of 0.6, assume that the first expansion entity has a click-through-rate of 0.2 and that the second expansion entity has an interest score of 0.3. In this example, the interest score for the second expansion entity can be adjusted (e.g., increased) relative to the interest score for the first expansion entity to reflect the higher click-through-rate for the second expansion entity.

The adjustment can be performed, for example, by computing a product of the interest score and the performance measures or selecting a scaling factor based on the performance scores. The scaling factor can be a value between 0.8 and 1.2 that is selected based on the level of performance for an expansion entity relative to the average performance of all expansion entities that were selected for a particular entity. For example, a scaling factor of 1.0 can be selected for expansion entities having a performance measure that is within a specified amount of the mean performance of the other expansion entities (or all expansion entities). Similarly, a scaling factor greater than 1.0 can be selected for expansion entities having a performance measure that is above the specified amount of the mean performance, and a scaling factor less than 1.0 can be selected for expansion entities having performance measures below the specified amount of the mean performance. In turn, the interest score for each expansion entity can be scaled, for example, by computing a product (or another function) of the interest score for the expansion entity and the scaling factor for the expansion entity.

Expansion entity selection can again be performed (312). In some implementations, the expansion entity selection can be performed using the updated interest scores for the expansion entities. The expansion entity selection can be performed in a manner similar to that described above.

Figure 4:
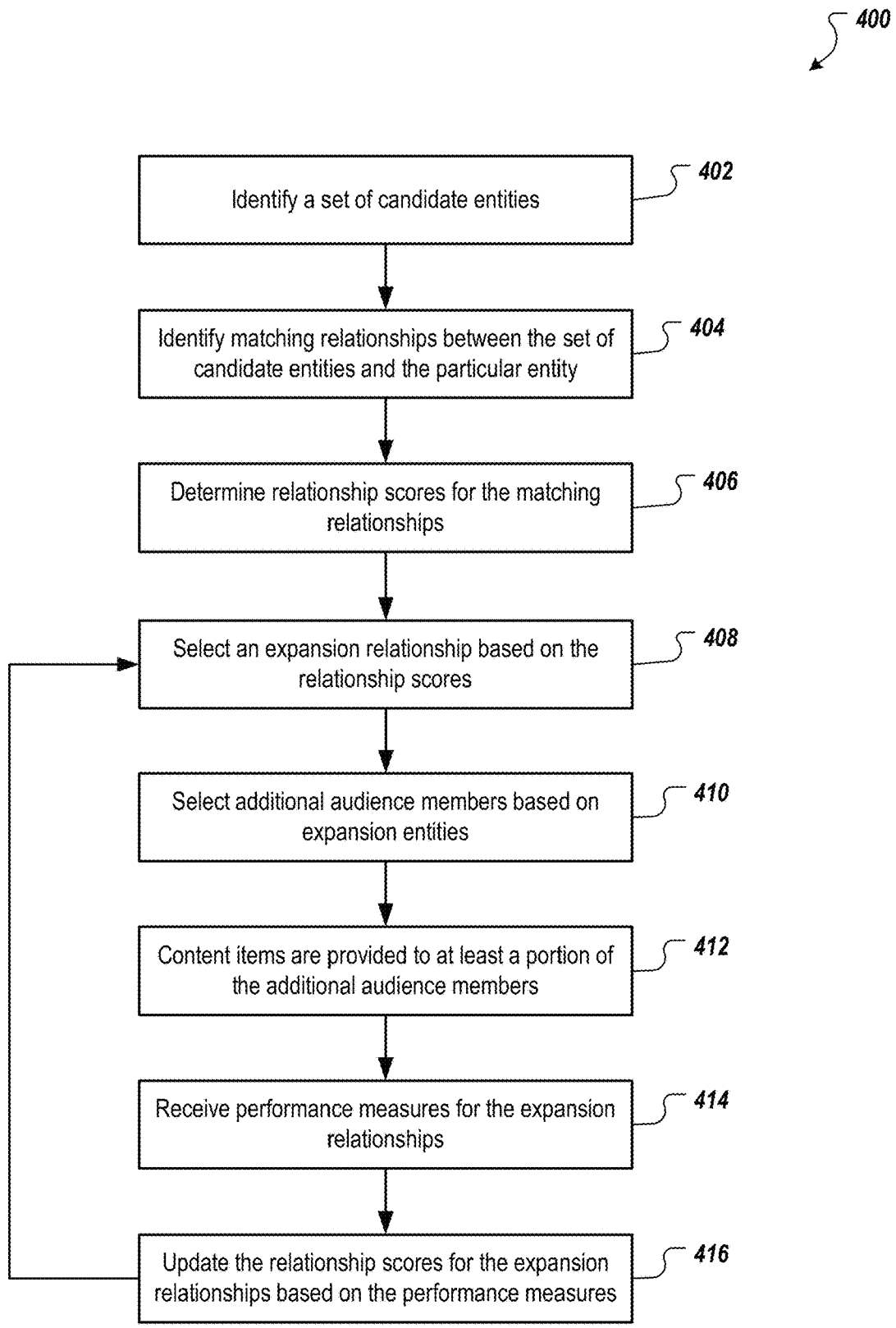
FIG. 4 is a block diagram of another example process for selecting audience members for a content item.

FIG. 4 is a block diagram of another example process 400 for selecting audience members for a content item. The process 400 can be performed by one or more data processing apparatus, such as the audience selection apparatus 120 and/or the content distribution system 110 of FIG. 1. Operations of the process 400 can by execution of instructions non-transitory computer readable medium that cause one or more data processing apparatus to perform operations of the process 400.

A set of candidate entities is identified (402). The set of candidate entities can be identified, for example, in a manner similar to that described above with reference to FIG. 3. For example, either in response to receiving a request to distribute content to an audience of users that have been deemed interested in a particular entity (or prior to such a request), users that are directly interested users for the particular entity are identified. Using the social graph, users that are socially connected to the directly interested users are identified, and using the knowledge grapy, entities in which the socially connected users have expressed an interest can be identified as candidate entities.

Matching relationships between the set of candidate entities and the particular entity are identified based on the knowledge graph (404). In some implementations, a matching relationship between a candidate entity and the particular entity is determined to exist when each of the candidate entity and the particular entity share a same or similar relationship with a third entity.

For example, with reference to FIG. 2 and according to the knowledge graph 214, the Prequel 224, MovieA 230, MovieB 232, and MovieC 234 are each connected to DirectorA 228 by a relationship path labeled "Directed By", and therefore share the relationship "Directed By" with DirectorA 228. Thus, in this example, the relationship "Directed By DirectorA" is a matching relationship between the Prequel 222 (the particular entity) and each of the candidate entities MovieA 230, MovieB 232, and MovieC 234.

Relationship scores are determined for the matching relationships (406). As noted above, a relationship score is a measure of interest, e.g., by the set of connected users, in candidate entities having a particular relationship that is shared by the particular entity and the candidate entities. In some implementations, the relationship score for a particular relationship is determined based, at least in part, on a portion of the socially connected users that have expressed an interest in an entity having the matching relationship and/or a number of the candidate entities that have the matching relationship.

For example, with reference to FIG. 2, the determination of the relationship score for "directed by DirectorA" can include identifying a portion of the socially connected users that are directly interested users for an entity having the relationship "directed by" with DirectorA 228. In this example, each of UserC 218, UserD 208, and UserE 216 have expressed an interest in an entity having the relationship "directed by" with DirectorA 228, such that all of the socially connected users for UserA 206 and UserB 210 are directly interested users for an entity having the relationship "directed by" with DirectorA 228. In some implementations, the relationship score could be set to 1.0 indicating that 100% of the socially connected users have expressed an interest in an entity having the matching relationship. In some implementations, the relationship score can be increase by a set amount (e.g., 0.1) for each socially connected user that has expressed an interest in an entity having the matching relationship. Thus, in some implementations, the relationship score for a particular matching relationship will increase with increases to the portion of the socially connected users that have expressed an interest in an entity having the matching relationship.

The determination of the relationship score can also (or alternatively) be based on the portion (e.g., a number of or percentage) of the matching relationship. For example, the determination of the relationship score for "directed by DirectorA" can include identifying a portion of the candidate entities that have the matching relationship. As noted above, MovieA 230, MovieB 232, and Movie C 234 each have the matching relationship "Directed By DirectorA," but ActressA 236 does not have the matching relationship. Thus, in this example, 3 of the 4 candidate entities (excluding candidate entity DirectorA 228, which is the subject of the matching relationship) have the matching relationship. In some implementations, the relationship score can be set to (or adjusted using) a value, such as 0.75, indicating that 3 out of the 4 candidate entities have the matching relationship. In some implementations, the relationship score can be increased a set amount based on each of the candidate entities have the matching relationship. Thus, in some implementations, the relationship score for a matching relationship will increase with increases in the portion of candidate entities having the matching relationship.

An expansion relationship is selected based on the relationship scores (408). In some implementations, the matching relationship having a highest relationship score is selected as the expansion relationship for the particular entity. In some implementations, each matching relationship having a relationship score that meets a relationship score threshold is selected as an expansion relationship for the particular entity. The relationship score threshold can be expressed, for example, as an absolute relationship score threshold (e.g., a relationship score of 0.5 on a scale from 0.0-1.0). The relationship score threshold can also, or alternatively, be expressed relative to other relationship scores for the other matching relationships. For example, the relationship score threshold can indicate that the matching relationships having relationship scores that are in a highest 10% of all relationship scores for the matching relationships can be selected as expansion relationships for the particular entity.

Additional audience members are selected based on the expansion relationship (410). In some implementations, users are selected to be additional audience members based, in part, on the relationship scores of the matching relationships. For example, those users that have expressed an interest in entities having a matching relationship with a highest relationship score can be selected as additional audience members. If the desired reach is not met after selecting additional audience members based on the highest relationship score, users that have expressed an interest in entities having a next highest relationship score can be selected as additional audience members. This selection process can iteratively repeat until the desired reach is met.

Other audience member selection techniques can be used. For example, for each matching relationship, the portion of the users that are selected as additional audience members can proportionate to (or a function of) the relative values of the relationship scores. For example, assume that 200,000 additional audience members are needed to reach the desired reach and that a first matching relationship has a relationship score of 0.6, while a second matching relationship has a relationship score of 0.4. In this example, if the portion of additional audience members selected using each matching relationship is proportional to the relationship scores, 120,000 (e.g., 200,000*0.6/(0.6+0.4)) users that expressed an interest in entities having the first matching relationship will be selected as additional audience members, while 80,000 (e.g., 200,000*0.4/(0.4+0.6)) users that expressed an interest in entities having the second matching relationship will be selected as additional audience members.

A content item is provided to at least a portion of the additional audience members (412). Content items can be provided to the additional audience members in a manner similar to that described above with reference to FIG. 3.

Performance measures for the expansion relationships are received (414). In some implementations, the performance measures for each expansion relationship are based, at least in part, on a click-through-rate and/or conversion rate for content provided to additional audience members additional audience members for the expansion relationship (e.g., the additional audience members that were selected based on the expansion relationship). The click-through-rate for an expansion relationship can be, for example, expressed as a ratio of a number of clicks on content provided to the additional audience members for the expansion relationship relative to a number of the additional audience members for the expansion relationship that received the content. Similarly, a conversion rate for an expansion relationship can be, for example, expressed as a ratio of a number of conversions performed by the additional audience members for the expansion relationship relative to a number of the additional audience members for the expansion relationship that received the content.

Relationship scores for the expansion relationships are updated based on the performance measures (416). In some implementations, the relationship score for each expansion relationship can be scaled based on the performance measures for that expansion relationship. To illustrate and continuing with the example above in which the first expansion relationship has a relationship score of 0.6 and the second expansion relationship has a relationship score of 0.4, assume that the first expansion relationship has a click-through-rate of 0.2 and that the second expansion relationship has an interest score of 0.3. In this example, the relationship score for the second expansion relationship can be adjusted (e.g., increased) relative to the relationship score for the first expansion relationship to reflect the higher click-through-rate for the second expansion relationship.

The adjustment can be performed, for example, by computing a product of the relationship score and the performance measures or selecting a scaling factor based on the performance scores. The scaling factor can be a value (e.g., between 0.8 and 1.2 or a value from another scale) that is selected based on the level of performance for an expansion relationship relative to the average performance of all expansion relationships that were selected for a particular entity. For example, a scaling factor of 1.0 can be selected for expansion relationships having a performance measure that is within a specified amount of the mean performance of the other expansion relationships (or all expansion relationships). Similarly, a scaling factor greater than 1.0 can be selected for expansion relationships having a performance measure that is above the specified amount of the mean performance, and a scaling factor less than 1.0 can be selected for expansion relationships having performance measures below the specified amount of the mean performance. In turn, the interest score for each expansion relationship can be scaled, for example, by computing a product (or another function) of the relationship score for the expansion relationship and the scaling factor for the expansion relationship.

An expansion relationship can again be performed (408). In some implementations, the expansion relationship selection can be performed using the updated relationship scores for the expansion relationships. The expansion relationship selection can be performed in a manner similar to that described above.

Figure 5:
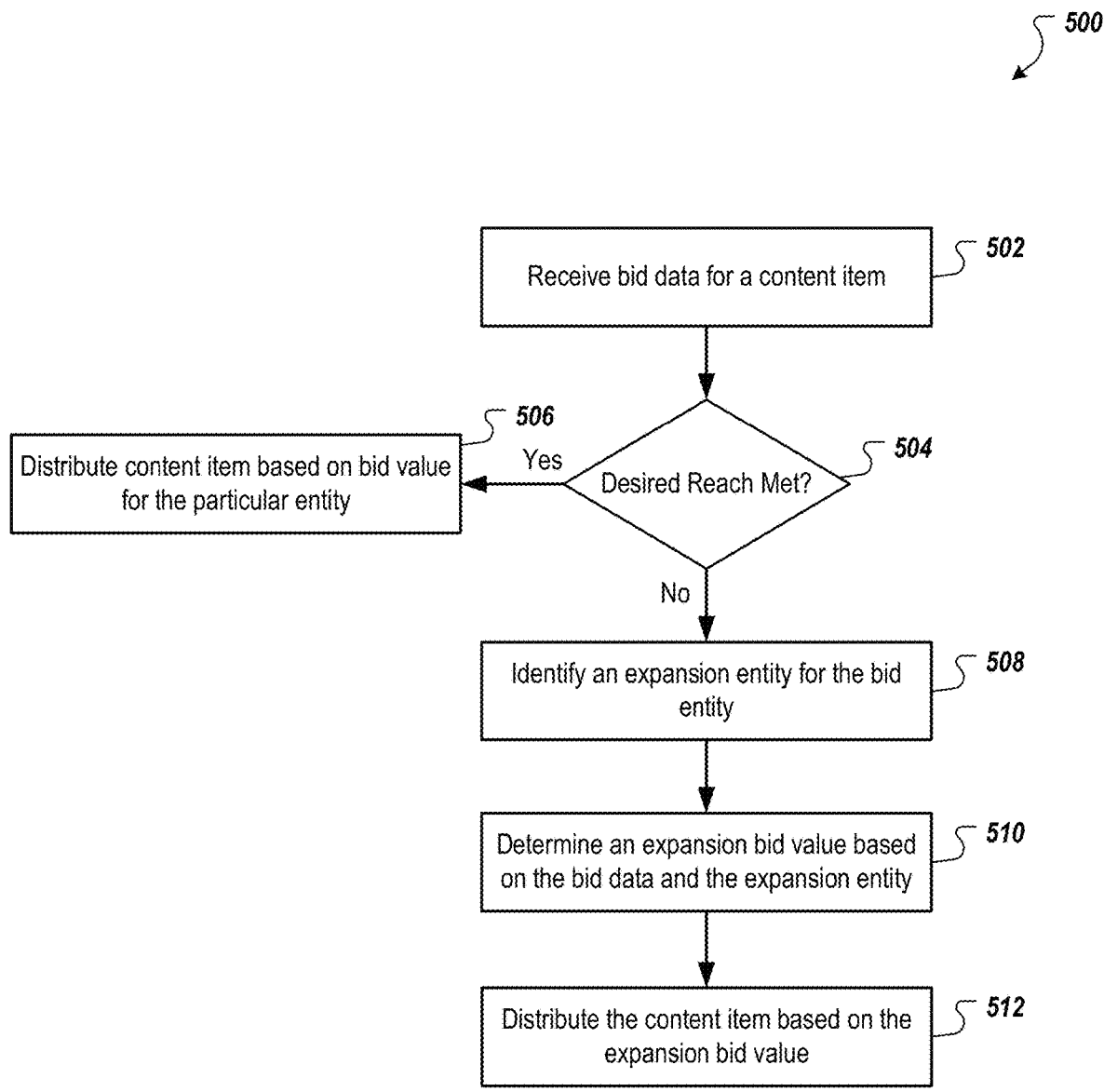
FIG. 5 is a flow chart of an example process for distributing content based on an entity bid.

FIG. 5 is a flow chart of an example process 500 for distributing content based on an entity bid. The process 500 can be performed by one or more data processing apparatus, such as the audience selection apparatus 120 and/or the content distribution system 110 of FIG. 1. Operations of the process 500 can be implemented by execution of instructions stored on a non-transitory computer readable medium that cause one or more data processing apparatus to perform operations of the process 500.

Bid data are received for a content item (502). In some implementations, the bid data are received from a data store storing the bid data, for example, with a reference to the content item. The bid data can be received, for example, from a content item provider that has requested distribution of the content item.

The bid data can include, for example, a bid and a bid entity. The bid is a specified value that the content item provider will pay for distribution of the content item. For example, the bid can be a maximum amount that the content item provider will pay for each presentation of and/or interaction with the content item.

The bid entity is data specifying one or more entities with which validity of the bid is conditioned. In some implementations, the bid entity specifies that the bid is only valid for presentations of the content item to users that have been deemed interested in at least one of the specified one or more entities. For example, assume that the bid data includes a bid value of $1.00 cost-per-click, and that the bid value is conditioned on the content item is presented to users that have been deemed interested in the prequel from the examples above. In this example, the content item provider will pay up to $1.00 for each click of the content item by users that have been deemed interested in the prequel, but in this example, has not agreed to pay for presentations of or clicks on the content item by users that have not been deemed interested in the prequel.

The bid data can also include, for example, a desired reach specifying a number of users to whom the content item is to be presented. For example, the desired reach can indicate that the content item is to be presented to 1,000,000 users that have been deemed interested in the prequel from the example above (or another particular entity).

In some implementations, the bid data can specify a different bid for each of multiple different entities, such that a content item provider can control the amount spent for distribution of the content item based on the entities in which the users are interested. For example, an advertiser can specify a bid of $100 per thousand impressions (e.g., $100 CPM) for presentations of an advertisement to users that have been deemed interested (e.g., directly interested) in the prequel, and can specify a bid of $10 CPM for presentations of the advertisement to users that have been deemed interested in a spoof of the prequel. Thus, the advertiser can specify different amounts that they are willing to pay based on the interests of the users.

A determination is made whether the desired reach will be met by users that are directly interested users for the bid entity (504). In some implementations, the determination can be made by identifying a number of users that have affirmatively expressed an interest in the bid entity and determining whether the identified number of users meets (e.g., equals or exceeds) the desired reach. As noted above, more than one bid entity can be specified, such that the determination can be made based on a total number of users that have expressed an interest in any of the bid entities.

If the desired reach is met, the content item can be distributed based on the bid value that was specified for (e.g., associated with) the bid entity (506). Continuing with the example above, the advertisement can be distributed to directly interested users for the prequel at a cost of (or based on a cost of) $100 CPM, while the advertisement can be distributed to directly interested users for the spoof of the prequel for $10 CPM.

If the desired reach is not met, an expansion entity can be identified for the bid entity (508). The expansion entity for the bid entity can be identified, for example, in a manner similar to that described above with reference to FIGS. 1-4.

An expansion bid value is determined based on the bid data and the expansion entity (510). The expansion bid value is a value that a content item provider will pay for distribution of a content item to additional audience members that were identified based on an expansion entity and/or an expansion relationship. The expansion bid value can be determined based on a function of the bid value, the interest score for an expansion entity, the relationship score for an expansion relationship, a degree of separation between the bid entity and the expansion entity, or other information indicative of a level of interest of the additional audience members in the bid entity.

For example, assume that a particular expansion entity has an interest score (relative to the bid entity) of 0.7, indicating that there is a 70% likelihood that the additional audience members selected using the particular expansion entity are interested in the bid entity. In this example, the expansion bid value can be determined to be the product (or another function) of the bid value and the interest score for the particular expansion entity. Thus, in this example, the expansion bid value will be 70% of the bid value for the bid entity.

When an expansion relationship is used to identify additional audience members, the expansion bid value can be determined in a similar manner. For example, the bid value for the bid entity can be adjusted using the relationship score for the expansion relationship that was used to identify the additional audience members. To illustrate, assume that the relationship score for a particular expansion relationship is 0.5, and that additional audience members are selected based on this expansion relationship. In this example, the expansion bid value can be 50% of the bid value for the bid entity. Other bid scaling techniques can also be used, for example, based on specified relationships between relationship scores (or interest scores) and bid adjustment factors. Thus, the expansion bid value need not be directly proportional to either the interest scores or relationship scores.

In some implementations, the expansion bid value can be based, at least in part, on a degree of separation between the bid entity and an expansion entity for the bid entity. For example, the expansion bid value can be decreased by a set amount for each degree of separation (e.g., for each relationship path) between the bid entity and the entity in which the additional audience members expressed an interest. To illustrate and with reference to FIG. 2, assume that the bid entity is the prequel 224 and that the additional audience members were identified users that are directly interested users for MovieC 234. In this example, there are two degrees of separation between the prequel 224 and MovieC 234, such that the expansion bid value can be decreased by two times the amount specified for a degree of separation. In some implementations, degree of separation adjustments can be combined with other techniques for determining the expansion bid value.

The content item is distributed based on the expansion bid value (512). In some implementations, the content item is distributed to the additional audience members that were selected for the content item, and the price charged to the content item provider will be the expansion bid value (or based on the expansion bid value) corresponding to the expansion entity or expansion relationship that was used to select the additional audience members.

Figure 6:
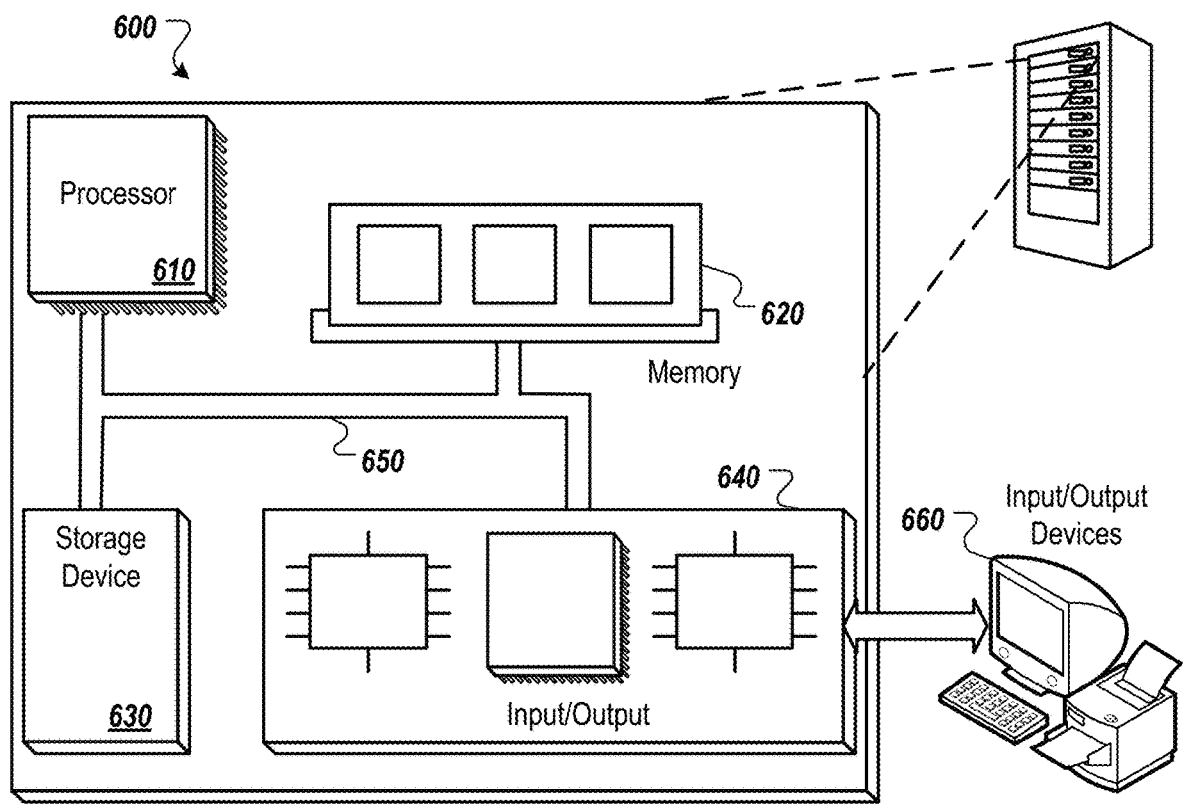
FIG. 6 is block diagram of an example computer system.

FIG. 6 is block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, wherein the one or more data processing apparatus comprise one or more processors configured to perform operations comprising:
   receiving a request to distribute content to a specified number of users of a particular social network that are interested in a first entity;
   determining that distribution of the content to users of the particular social network that have expressed an interest in the first entity will reach fewer than the specified number of users; and
   in response to determining that the distribution will reach fewer than the specified number of users, using links in both of a social graph and a knowledge graph to expand an audience for the content beyond the users that have expressed an interest in the first entity, including:
      identifying, within a social graph, links between nodes that identify a set of users that are socially connected, in the particular social network, to a particular user who has expressed an interest in the first entity;
      after identifying the set of users, identifying a set of entities beyond the first entity in which the set of users have expressed an interest;
      accessing the knowledge graph to identify one or more relationships that connect the set of entities to the first entity in the knowledge graph;
      determining, based on the identified relationships, a largest number of entities from the set of entities that share a same relationship with the first entity;
      classifying the same relationship to the first entity as an expansion relationship based on the largest number of entities sharing the same relationship with the first entity;
      selecting the users in the particular social network that have expressed an interest in other entities that share the same relationship with the first entity, but have not expressed an interest in the first entity as additional audience members that will receive the content based on the same relationship being classified as an expansion relationship for the first entity; and
      distributing the content to the users of the particular social network that have expressed an interest in the first entity as well as the additional audience members that have expressed an interest in the other entities.

2. The method of claim 1, further comprising determining a relationship score for the same relationship based on a portion of the set of users who have expressed an interest in an entity that shares the same relationship with the first entity, wherein classifying the same relationship as an expansion relationship is further based on the relationship score.

3. The method of claim 2, wherein determining the relationship score further comprises determining the relationship score based on a portion of the set of entities that share the same relationship with the first entity.

4. The method of claim 2, further comprising:
   classifying one or more additional relationships between the first entity and entities in the set of entities as an expansion relationship based on corresponding relationship scores for the one or more additional relationships meeting a relationship score threshold; and
   distributing the content to users of the particular social network that have expressed an interest in the one or more additional entities, but have not expressed an interest in the first entity.

5. The method of claim 1, wherein determining that distribution of the content to users of the particular social network that have expressed an interest in the first entity will reach fewer than the specified number of users comprises determining that fewer of than the specified number of users have interacted with a positive feedback element that references the first entity.

6. The method of claim 5, wherein determining that fewer of than the specified number of users have interacted with a positive feedback element that references the first entity comprises determining that fewer of than the specified number of users have performed none of interacting with a positive feedback element that references the first entity, visiting a social network page about the first entity, and identifying the first entity as an interest in the users' social network profiles.

7. The method of claim 1, wherein selecting the users as additional audience members comprises selecting, as additional audience members, only those users that are socially connected to the particular user in the particular social network and that have expressed an interest in at least one of the other entities.

8. A system, comprising:
one or more data stores storing data representing a social graph and data representing a knowledge graph that is different from the social graph; and
one or more data processing apparatus comprising one or more processors, wherein the one or more processors interact with the one or more data stores and execute instructions that cause the one or more data processing apparatus to perform operations comprising:
receiving a request to distribute content to a specified number of users of a particular social network that are interested in a first entity;
determining that distribution of the content to users of the particular social network that have expressed an interest in the first entity will reach fewer than the specified number of users; and
in response to determining that the distribution will reach fewer than the specified number of users, using links in both of a social graph and a knowledge graph to expand an audience for the content beyond the users that have expressed an interest in the first entity, including:
identifying, within a social graph, links between nodes that identify a set of users that are socially connected, in the particular social network, to a particular user who has expressed an interest in the first entity;
after identifying the set of users, identifying a set of entities beyond the first entity in which the set of users have expressed an interest;
accessing the knowledge graph to identify one or more relationships that connect the set of entities to the first entity in the knowledge graph;
determining, based on the identified relationships, a largest number of entities from the set of entities that share a same relationship with the first entity;
classifying the same relationship to the first entity as an expansion relationship based on the largest number of entities sharing the same relationship with the first entity;
selecting the users in the particular social network that have expressed an interest in other entities that share the same relationship with the first entity, but have not expressed an interest in the first entity as additional audience members that will receive the content based on the same relationship being classified as an expansion relationship for the first entity; and
distributing the content to the users of the particular social network that have expressed an interest in the first entity as well as the additional audience members that have expressed an interest in the other entities.

9. The system of claim 8, wherein the instructions cause the one or more data processing apparatus to perform operations comprising determining a relationship score for the same relationship based on a portion of the set of users who have expressed an interest in an entity that shares the same relationship with the first entity, wherein classifying the same relationship as an expansion relationship is further based on the relationship score.

10. The system of claim 9, wherein determining the relationship score further comprises determining the relationship score based on a portion of the set of entities that share the same relationship with the first entity.

11. The system of claim 9, wherein the instructions cause the one or more data processing apparatus to perform operations comprising:
classifying one or more additional relationships between the first entity and entities in the set of entities as an expansion relationship based on corresponding relationship scores for the one or more additional relationships meeting a relationship score threshold; and
distributing the content to users of the particular social network that have expressed an interest in the one or more additional entities, but have not expressed an interest in the first entity.

12. The system of claim 8, wherein determining that distribution of the content to users of the particular social network that have expressed an interest in the first entity will reach fewer than the specified number of users comprises determining that fewer of than the specified number of users have interacted with a positive feedback element that references the first entity.

13. The system of claim 12, wherein determining that fewer of than the specified number of users have interacted with a positive feedback element that references the first entity comprises determining that fewer of than the specified number of users have performed none of interacting with a positive feedback element that references the first entity, visiting a social network page about the first entity, and identifying the first entity as an interest in the users' social network profiles.

14. The system of claim 8, wherein selecting the users as additional audience members comprises selecting, as additional audience members, only those users that are socially connected to the particular user in the particular social network and that have expressed an interest in at least one of the other entities.

15. A non-transitory computer storage medium encoded with a computer program, the program comprising instructions that when executed by one or more data processing apparatus cause the one or more data processing apparatus to perform operations comprising:
receiving a request to distribute content to a specified number of users of a particular social network that are interested in a first entity;
determining that distribution of the content to users of the particular social network that have expressed an interest in the first entity will reach fewer than the specified number of users; and
in response to determining that the distribution will reach fewer than the specified number of users, using links in both of a social graph and a knowledge graph to expand an audience for the content beyond the users that have expressed an interest in the first entity, including:
identifying, within a social graph, links between nodes that identify a set of users that are socially connected, in the particular social network, to a particular user who has expressed an interest in the first entity;
after identifying the set of users, identifying a set of entities beyond the first entity in which the set of users have expressed an interest;
accessing the knowledge graph to identify one or more relationships that connect the set of entities to the first entity in the knowledge graph;

determining, based on the identified relationships, a largest number of entities from the set of entities that share a same relationship with the first entity;

classifying the same relationship to the first entity as an expansion relationship based on the largest number of entities sharing the same relationship with the first entity;

selecting the users in the particular social network that have expressed an interest in other entities that share the same relationship with the first entity, but have not expressed an interest in the first entity as additional audience members that will receive the content based on the same relationship being classified as an expansion relationship for the first entity; and distributing the content to the users of the particular social network that have expressed an interest in the first entity as well as the additional audience members that have expressed an interest in the other entities.

16. The non-transitory computer storage medium of claim 15, wherein the instructions cause the one or more data processing apparatus to perform operations comprising determining a relationship score for the same relationship based on a portion of the set of users who have expressed an interest in an entity that shares the same relationship with the first entity, wherein classifying the same relationship as an expansion relationship is further based on the relationship score.

17. The non-transitory computer storage medium of claim 16, wherein determining the relationship score further comprises determining the relationship score based on a portion of the set of entities that share the same relationship with the first entity.

18. The non-transitory computer storage medium of claim 16, wherein the instructions cause the one or more data processing apparatus to perform operations comprising:

classifying one or more additional relationships between the first entity and entities in the set of entities as an expansion relationship based on corresponding relationship scores for the one or more additional relationships meeting a relationship score threshold; and distributing the content to users of the particular social network that have expressed an interest in the one or more additional entities, but have not expressed an interest in the first entity.

19. The non-transitory computer storage medium of claim 15, wherein determining that distribution of the content to users of the particular social network that have expressed an interest in the first entity will reach fewer than the specified number of users comprises determining that fewer of than the specified number of users have interacted with a positive feedback element that references the first entity.

20. The non-transitory computer storage medium of claim 19, wherein determining that fewer of than the specified number of users have interacted with a positive feedback element that references the first entity comprises determining that fewer of than the specified number of users have performed none of interacting with a positive feedback element that references the first entity, visiting a social network page about the first entity, and identifying the first entity as an interest in the users' social network profiles.

* * * * *